United States Patent [19]

Arnold et al.

[11] Patent Number: 5,320,384
[45] Date of Patent: Jun. 14, 1994

[54] APPARATUS FOR REDUCING THE LIKELIHOOD OF INJURY TO DRIVERS OF MOTOR VEHICLES AS A RESULT OF HEAD-ON COLLISIONS

[75] Inventors: Hans Arnold, Lage; Manfred Breuer, Halle, both of Fed. Rep. of Germany

[73] Assignee: Reiche & Co., Lage, Fed. Rep. of Germany

[21] Appl. No.: 961,073

[22] Filed: Oct. 14, 1992

[30] Foreign Application Priority Data

Oct. 14, 1991 [DE] Fed. Rep. of Germany ....... 4133960

[51] Int. Cl.$^5$ .............................................. B62D 1/11
[52] U.S. Cl. .................................... 280/777; 280/779
[58] Field of Search ................ 280/777, 779; 180/232, 180/274

[56] References Cited

U.S. PATENT DOCUMENTS

| | | | |
|---|---|---|---|
| 4,884,652 | 12/1989 | Vollmer | 280/777 |
| 4,946,195 | 8/1990 | Ioka et al. | 280/777 |
| 5,174,409 | 12/1992 | Osawa | 280/777 |

FOREIGN PATENT DOCUMENTS 3337231 1/1987 Fed. Rep. of Germany .

OTHER PUBLICATIONS

Pamphlet: "Audi" Fernab Vom Standard Die Hochwertige Crayon-Serienausstattung (Eine genial Erfindung zum Thema Sicherheit. Das Audi Sicherheitssystem procon-ten).

*Primary Examiner*—Richard M. Camby
*Assistant Examiner*—Paul Dickson
*Attorney, Agent, or Firm*—Darby & Darby

[57] ABSTRACT

The steering wheel column and/or the bearing for the steering wheel column in a motor vehicle is pushed or pulled away from a position in front of the driver in the event of a head-on collision whose intensity exceeds a preselected minimum value. The displacing unit which is activated in the event of head-on collision of preselected minimum intensity (e.g., a collision which causes the engine block and/or the transmission case to move rearwardly with reference to the frame of the motor vehicle) can entrain the steering wheel column and/or the bearing for the steering wheel column by way of a carrier which is pivotably mounted adjacent the steering wheel column or its bearing and has one or more projections with cutting edges penetrating into the steering wheel column and/or bearing in response to activation of the displacing unit. Each projection can include a cylindrical portion which extends at an oblique angle from a side of the carrier and whose axis preferably makes an acute angle with an adjacent surface of the steering wheel column or its bearing.

8 Claims, 5 Drawing Sheets

APPARATUS FOR REDUCING THE LIKELIHOOD OF INJURY TO DRIVERS OF MOTOR VEHICLES AS A RESULT OF HEAD-ON COLLISIONS

BACKGROUND OF THE INVENTION

The invention relates to improvements in apparatus for reducing the likelihood of injury to drivers of motor vehicles. More particularly, the invention relates to improvements in apparatus which do not or need not employ air bags. Still more particularly, the invention relates to improvements in apparatus which are designed to move the steering wheel away from a position directly in front of and close to the driver in automatic response to a head-on collision so that the driver is less likely to be injured or killed by the steering wheel, by the column for the steering wheel and/or by the structure which rotatably and/or otherwise mounts the column for the steering wheel.

Published German patent application No. 33 37 231 of AUDI NSU AUTO UNION discloses a safety system which can be installed in motor vehicles and is designed to move the steering wheel out of the way within a minute fraction of a second in response to a head-on collision which results in predetermined displacement of the engine block and/or the transmission case relative to the frame of the motor vehicle. The dispatch with which the steering wheel is displaced from its normal position in front of the driver suffices to enable the safety belt or belts to intercept the body of the driver so that the steering wheel is moved away from its normal position before the driver's body advances forwardly to an extent which, in the absence of displacement of the steering wheel, would result in a pronounced impact against the steering wheel and potential serious or deadly injury to the driver.

The makers of AUDI automobiles offer the aforediscussed safety system, under the name "procon-ten", as an option for installation in certain types of their vehicles. The safety system which is presently offered for sale as an optional feature for installation in certain types of AUDI automobiles is further designed to tension the safety belt or belts simultaneously with movements of the steering wheel and its column out of the way to thus further enhance the likelihood that the driver will survive, or will not be seriously injured as a result of, a head-on collision which entails a rearward displacement of the engine block and/or the transmission case relative to the frame of the damaged or destroyed motor vehicle. To summarize, the operation of the "procon-ten" safety system is based on the principle that the forward movement of the driver's body is to be delayed by the tensioned safety belt or belts as well as that the distance between the driver's body prior to the accident and the position in which the driver's body would strike the steering wheel and/or the dashboard and/or the windshield is to be increased.

Problems can arise when the column for the steering wheel of a motor vehicle is adjustable. Such adjustment can take place in the axial direction of the column and/or it can involve a pivotal movement about an axis which is normal to the axis of the column for the steering wheel and/or a change of the level of the steering wheel. Adjustability of the column is desirable and advantageous in order to enhance the comfort to the driver of the motor vehicle by permitting adjustments which are necessary to provide adequate room for slender, corpulent, tall, short and/or handicapped drivers while, at the same time, ensuring that the driver can readily manipulate the steering wheel. An adjustable steering wheel column, especially a column which is adjustable in several ways, cannot be positively connected to the safety system without interfering with convenience of adjustment of the column or without preventing such adjustment.

OBJECTS OF THE INVENTION

An object of the invention is to provide a novel and improved apparatus which greatly reduces the likelihood of injury to the driver of a motor vehicle embodying the aforediscussed safety system, even if the steering wheel cannot be directly coupled to the unit which serves to displace the steering wheel from its normal or selected position.

Another object of the invention is to provide a novel and improved connection between that part of a so-called "procon-ten" safety system which is responsive to shifting of the engine block and/or transmission case relative to the vehicle frame and relative to the part or parts which carries or carry and/or guides or guide the steering wheel.

A further object of the invention is to provide the apparatus with novel and improved means for transmitting motion to the steering wheel column and/or to the bearing for the steering wheel column in the event of a head-on collision of an intensity which is likely or certain to cause serious injury or death to the driver in the absence of any precautionary measures to the contrary.

An additional object of the invention is to provide a novel and improved safety system which can be utilized with advantage in motor vehicles having adjustably installed steering wheels.

Still another object of the invention is to provide a simple and inexpensive but reliable and sturdy operative connection between the aforediscussed "procon-ten" safety system and the steering wheel of a motor vehicle.

A further object of the invention is to provide an apparatus which can be installed in existing motor vehicles or in new motor vehicles and requires no attention of any kind on the part of the driver of the motor vehicle.

Another object of the invention is to provide a motor vehicle which embodies the above outlined apparatus.

An additional object of the invention is to provide a novel and improved method of establishing a reliable connection between a safety system and a steering wheel in the event of a head-on collision of the vehicle embodying the safety system and another vehicle or another large and heavy structure.

Still another object of the invention is to provide an apparatus which is designed to occupy space that is available in motor vehicles of the type embodying the so-called "procon-ten" safety system.

SUMMARY OF THE INVENTION

The invention is embodied in an apparatus for reducing the likelihood of injury to a driver of a motor vehicle of the type wherein a column member for a steering wheel is installed in a bearing member and at least one of these members is movable away from a position in front of the driver of the motor vehicle by a displacing unit which is responsive to a head-on collision of an intensity exceeding a predetermined minimum value. The improved apparatus comprises a mobile carrier (e.g., a metallic or plastic block) which is adjacent the at least one member and is connected with the displacing unit to be displaced in the event of a collission of greater than predetermined minimum intensity, and means for coupling the carrier to the at least one member in response to displacement of the carrier by the displacing unit so that the at least one member is moved away from the position in front of the driver of the motor vehicle which is involved in a head-on collision.

The coupling means can comprise at least one projection which establishes a form locking connection between the carrier and the at least one member in response to displacement of the carrier by the displacing unit. The at least one projection can be provided with a cutting edge which penetrates into the at least one member in response to displacement of the carrier by the displacing unit. In accordance with a presently preferred embodiment of the coupling means, the at least one projection includes a substantially cylindrical portion, and the cutting edge is provided on such cylindrical portion. The at least one member has a surface which is preferably adjacent the cylindrical portion of the at least one projection and makes with the axis of the cylindrical portion an oblique angle, particularly an acute angle. The carrier has a side which is adjacent the at least one member; the cylindrical portion extends from such side of the carrier and its axis preferably makes with this side an oblique angle.

The displacing unit can comprise means for pulling and/or pushing the carrier in response to a head-on collision of predetermined minimum intensity.

It is often advisable to mount the carrier for pivotal movement relative to the at least one member, preferably about an axis which is normal to and crosses in space with the axis of the steering column member.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawings.

DESCRIPTION OF PREFERRED EMBODIMENTS

Figure 1:
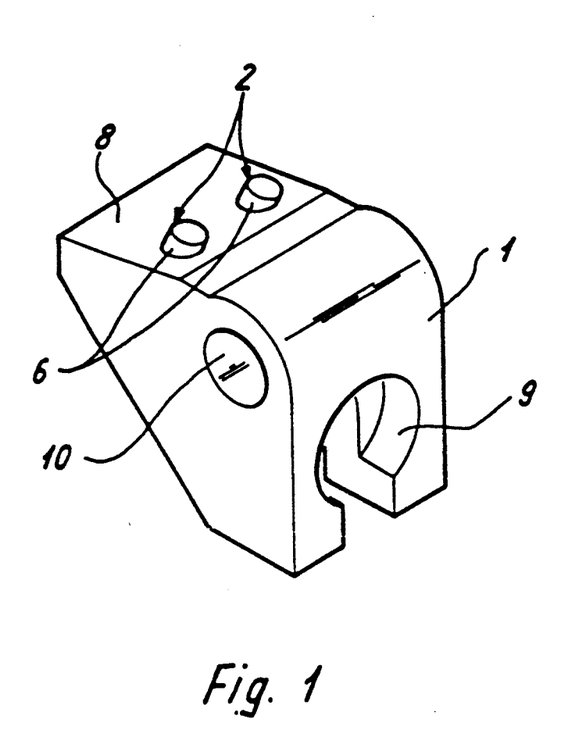
FIG. 1 is a perspective view of a portion of the improved apparatus.
Figure 5:
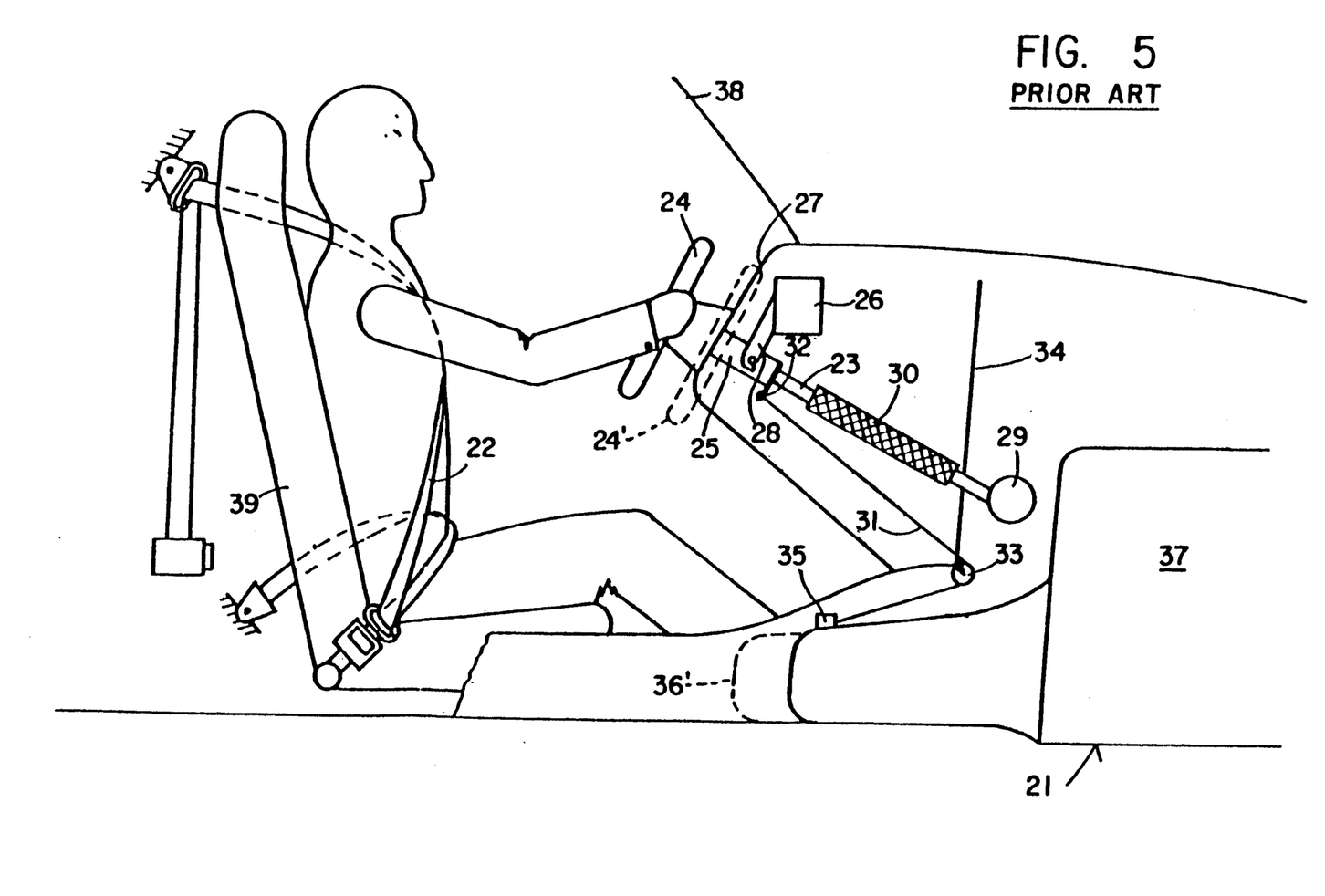
FIG. 5 is a fragmentary schematic side elevational view of a motor vehicle embodying a conventional displacing unit which can be utilized to transmit motion to the carrier of the improved apparatus.

Referring first to FIG. 5, there is shown one embodiment of a conventional safety system of the type shown in FIG. 1 of published German patent application No. 33 37 231 owned by AUDI. The safety system is installed in a motor vehicle wherein the occupant of the driver's seat 39 can secure her or his torso to the frame 21 by a standard three-point belt arrangement 22. The column 23 for a steering wheel 24 is rotatable in a bearing 25 which is separably coupled to a transverse frame member 26 behind the dashboard 27 by one or more brackets 28. The front end portion of the column 23 is connected to the input element of a steering mechanism 29, and an intermediate portion 30 of the column 23 is collapsible in response to a predetermined compressive stress so as to permit the steering wheel 24 to move forwardly nearer to the mechanism 29 and/or vice versa. The steering wheel 24 can be moved from the normal position (shown in FIG. 5 by solid lines) to a front end (retracted) position 24' (in which the steering wheel is or can be at least partially recessed into a suitably configured recess of the dashboard 27) by a flexible element 31 (e.g., a steel cable or a chain) one end of which is affixed to the bearing 25 (as at 32) and which is trained over a pulley or sprocket wheel 33 carried by a wall 34 of the vehicle frame 21. The other end of the flexible element 31 is attached (as at 35) to the case of a transmission 36 extending rearwardly from an engine block 37 under the hood of the motor vehicle.

When the vehicle embodying the structure of FIG. 5 is involved in a head-on collision with another vehicle, with a building or with any other heavy and bulky structure which causes the engine block 37 to shift the transmission case 36 with reference to the frame 21 from the solid-line position to the broken-line position 36', the flexible element 31 immediately pulls the bearing 25 and the rear portion of the steering wheel column 23 (and hence the steering wheel 24) forwardly. The steering wheel 24 is moved to the position 24' and the intermediate portion 30 of the column 23 collapses to the necessary extent so that the driver of the vehicle is less likely to strike the steering wheel with her or his head or torso. At the same time, another flexible element or an analogous motion transmitting part (not shown) tensions the belt arrangement 22 so that the torso of the driver is even less likely to be propelled forward all the way into engagement with the (forwardly) retracted steering wheel 24 (in the position 24') and/or with the windshield 38. All this takes place within a minute fraction of a second. Of course, the intensity of the impact of the front end of the vehicle against a second vehicle or against another structure must be sufficient to cause a predetermined rearward displacement of the transmission case 36 (e.g., all the way to the position 36') so that the intermediate portion 30 of the steering wheel column 23 yields and enables the flexible element 31 to (indirectly) pull the steering wheel 24 to the position 24' in which the steering wheel is less likely to, or cannot, injure or kill the driver of the motor vehicle.

As described in the published German patent application of AUDI, it is equally possible to cause the flexible element 31 or another flexible element to receive motion directly from the engine block in order to retract the steering wheel forwardly toward or into the dashboard in response to a head-on collision of such intensity or magnitude that the structure which normally maintains the steering wheel in an optimum position for the hands of the driver will yield and cause the steering wheel to move away from the torso and head of the driver. The published patent application of AUDI further describes a fluid-operated safety system (e.g., a hydraulic system) which responds to collision-induced rearward movement of the engine block and/or transmission case in order to pull or push the steering wheel forwardly to a position corresponding to that shown at 24' in FIG. 5 or to any other position in which the steering wheel is less likely to injure or kill the driver. Still further, the published German patent application of AUDI describes a safety system (called a pyrotechnical safety system) wherein an explosive charge is detonated by a switch which is actuated in response to rearward movement of the engine block and/or transmission case relative to the frame or chassis of the motor vehicle. The explosion results in abrupt admission of compressed gaseous fluid into a cylinder which causes a piston rod to push or pull the steering wheel to a position corresponding to the position 24' of the steering wheel 24 of FIG. 5.

FIG. 1 shows the main constituents of an apparatus which embodies one form of the present invention and is designed to effect forwardly and/or laterally and/or upwardly and/or downwardly oriented retraction of a steering wheel 20 (indicated in FIG. 3 by phantom lines) in the event of a head-on collision of the motor vehicle embodying the improved apparatus. The apparatus includes a block-shaped carrier 1 and two preferably (but not necessarily) identical coupling elements 6 extending from the upper side 8 of the carrier. The carrier 1 has a through hole 10 for a shaft 7 (FIGS. 2, 3 and 4) which renders it possible to adjust the axial position and-or the angular position (orientation) of the steering wheel 20 relative to the body of the driver of the motor vehicle. The purpose of the apparatus including the carrier 1 and the coupling elements 6 is to ensure that the steering wheel 20 is moved to a position corresponding to the position 24' of the steering wheel 24 of FIG. 5 even though the flexible element 31 (FIG. 2) or another displacing device is not directly connected to the steering wheel 20, its column 4 and/or the bearing 3 for the column 4. The reason for the absence of a direct connection between the displacing unit including the flexible element 31 and the steering wheel 20, its column 4 and/or the bearing 3 for the column 4 is that the steering wheel is adjustable in and transversely of the axial direction of its column and is also pivotable about the axis of the shaft 7.

The steering wheel column 4 comprises several coaxial sections (see FIGS. 2 and 3) which are telescoped into each other. The maximum-diameter section of the column 4 is rotatably mounted in the bearing 3 which is disposed between and is welded or otherwise fixedly secured to two parallel walls 14 flanking the carrier 1. The walls 14 have aligned elongated slots 15 for the shaft 7, and these slots are substantially parallel to the common axis of the column 4 and bearing 3. The slots 15 extend substantially at right angles to elongated slots 16 which are aligned with each other and are provided in two spaced-apart brackets 5 affixed to or forming part of the frame or chassis of the motor vehicle. For example, the brackets 5 can be affixed to the dashboard. The shaft 7 extends through the slots 15 as well as through the slots 16 and enables the bearing 3 (and hence the column 4) to move axially (the slots 15 then move relative to the shaft 7), to change its inclination (the walls 14 then turn about the axis of the shaft 7) and/or to change its level (the walls 14 and the shaft 7 then move up or down relative to the slots 16). A lever 17 can be actuated by hand to operate a clamping mechanism 40 (shown in the righthand portion of FIG. 4) in order to releasably fix the bearing 3 and the column 4 (and hence the steering wheel 20) in a selected axial position, at a selected level and in a selected orientation (inclination) relative to the brackets 5 of the motor vehicle frame.

The carrier 1 of the improved apparatus is turnable on the shaft 7 between the walls 14 and its side 8 faces upwardly toward a flat or substantially flat surface at the underside of a motion receiving element 18 forming part of or affixed to the bearing 3 and/or to the walls 14. As can be seen in FIG. 1, the carrier 1 has a socket 9 which can receive a suitably configurated plug or an analogous part at the respective end of a flexible element 31 (a portion shown in FIG. 2) which pulls the carrier 1 in a direction to the left, as viewed in FIG. 2 or 3) in the event of a head-on collision. Such movement of the carrier 1 must result in a movement of the bearing 3, column 4 and steering wheel 20 in the same direction, e.g., axially of the column 4 and away from the torso and/or head of the driver of the motor vehicle. This is achieved by the coupling elements 6 which are immediately or closely adjacent the underside of the motion receiving portion 18 of the bearing 3. Those portions of the coupling elements 6 which extend beyond the upper side 8 of the carrier 1 preferably constitute cylindrical pins whose axes make oblique angles with the underside of the motion receiving portion 18 as well as with the upper side 8 of the carrier 1. The angle between the axes of the cylindrical portions of coupling elements 6 and the underside of the motion receiving portion 18 is preferably an acute angle.

In accordance with an additional feature of the invention, the top faces of the coupling elements 6 are bounded by cylindrical cutting edges 2 which penetrate into the underside of the motion receiving portion 18 in response to a pull upon the flexible element 31 (arrow A in FIG. 2) so that the elements 6 are even more likely to entrain the bearing 3, the column 4 and the steering wheel 20 in the direction of arrow A when the vehicle embodying the improved apparatus is involved in a head-on collision of a magnitude or intensity required to displace the engine block and/or the transmission case in order to induce a leftward movement of the carrier 1 (as viewed in FIG. 3) as well as simultaneous clockwise pivotal movement of the carrier in order to establish a form-locking connection between the coupling elements 6 and the motion receiving portion 18 of the bearing 3.

The feature that the axes of exposed cylindrical portions of the coupling elements 6 make acute angles with the underside of the motion receiving portion 18 is desirable and advantageous because this ensures gradual penetration of the cutting edges 2 into the material of the portion 18. The initial engagement between the elements 6 and the motion receiving portion 18 can be said to constitute a mere point contact, but the area of contact (i.e., the depth of penetration of cutting edges 2 into the portion 18) is increased instantaneously if the carrier 1 continues to pivot in a clockwise direction (as viewed in FIG. 3).

The establishment of oblique angles between the axes of exposed cylindrical portions of the coupling elements 6 and the upper side 8 of the carrier 1 is desirable on the ground that the extent of frictional engagement between the external surfaces of the elements 6 and the carrier 1 is increased to thus reduce the likelihood of deeper penetration of the elements 6 into the carrier. Of course, the elements 6 can be made of one piece with the carrier 1 or those portions of separately produced coupling elements which are embedded in the carrier can be configured to prevent any undesirable shifting of such elements relative to the carrier and/or vice versa.

The carrier 1 can be made of a metallic or plastic material. Furthermore, such carrier can constitute a laminated (multi-layer) structure which is capable of standing the expected stresses in order to ensure that the elements 6 can entrain the bearing 3, the column 4 and the steering wheel 20 away from the occupant of the driver's seat in the event of an accident involving a head-on collision. As mentioned above, the coupling elements 6 can be made of one piece with the carrier 1 or they can be embedded therein or otherwise reliably affixed thereto, e.g., with an adhesive, by welding, brazing or soldering. The material of the coupling elements 6 may but need not be the same as that of the carrier 1. For example, the elements 6 can constitute projections made of a metallic material or in part of a metallic and in part of another suitable material.

The shaft 7 is flattened at 7a (FIG. 4) in the regions where it extends through the walls 14 in order to enlarge the area of force-transmitting engagement with the bearing 3. This reduces the magnitude of forces acting per unit area of the shaft 7 and the walls 14 and thus reduces the likelihood of damage to or destruction of such parts.

The brackets 5 are affixed to or form part of the frame of the motor vehicle. These brackets are preferably provided with weakened portions (at 13) which break or permit separation of the brackets from the frame in response to the application of stresses exceeding a predetermined magnitude, e.g., in the event of a head-on collision.

Figure 3:
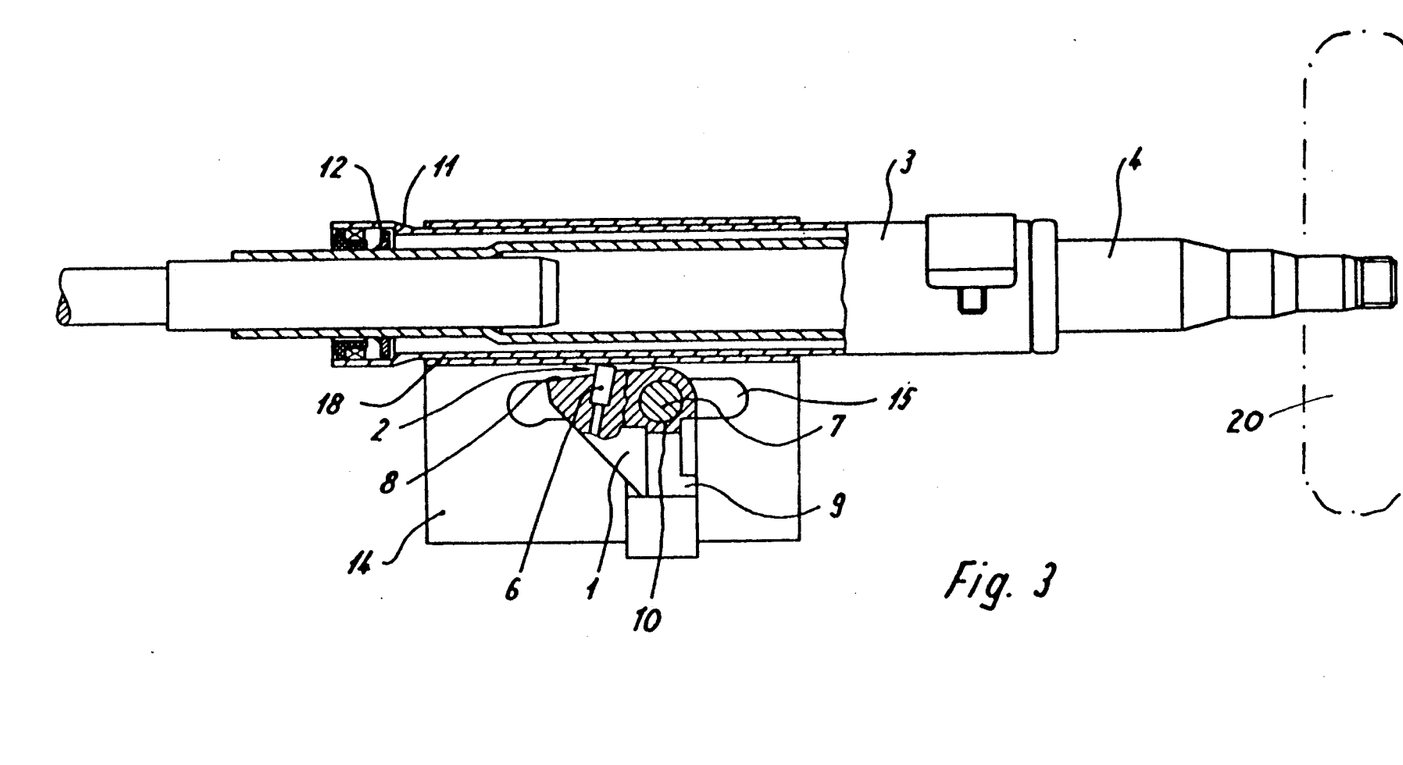
FIG. 3 is a view similar to that of FIG. 2 but with certain parts omitted and with certain parts shown in a partly elevational partly central vertical sectional view.
Figure 4:
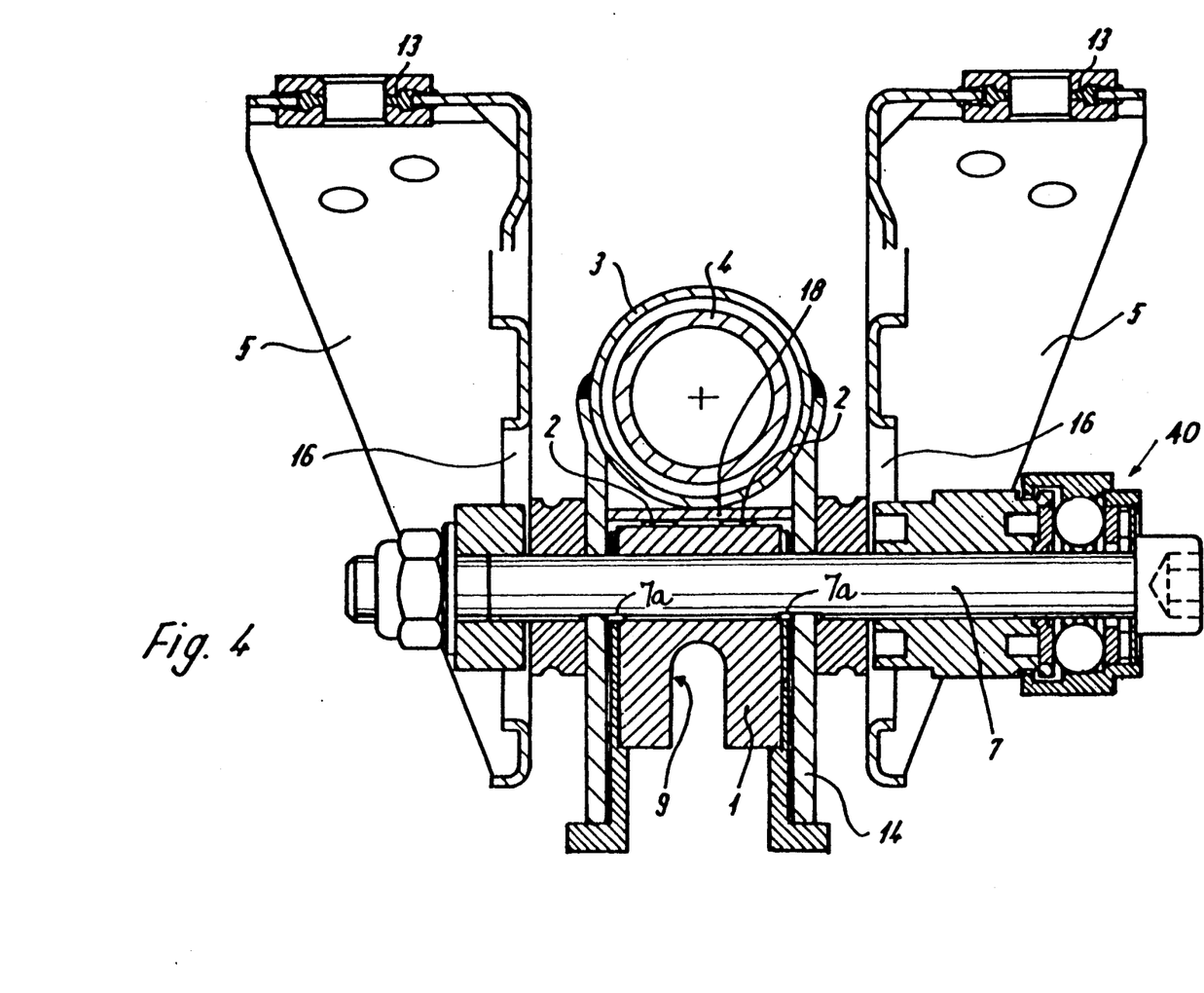
FIG. 4 is an enlarged transverse sectional view substantially as seen in the direction of arrows from the line IV—IV in FIG. 2.

FIG. 3 shows a seal 12 which is provided between the internal surface of the rearmost portion 11 of the bearing 3 and the external surface of the adjacent section of the column 4.

Figure 2:
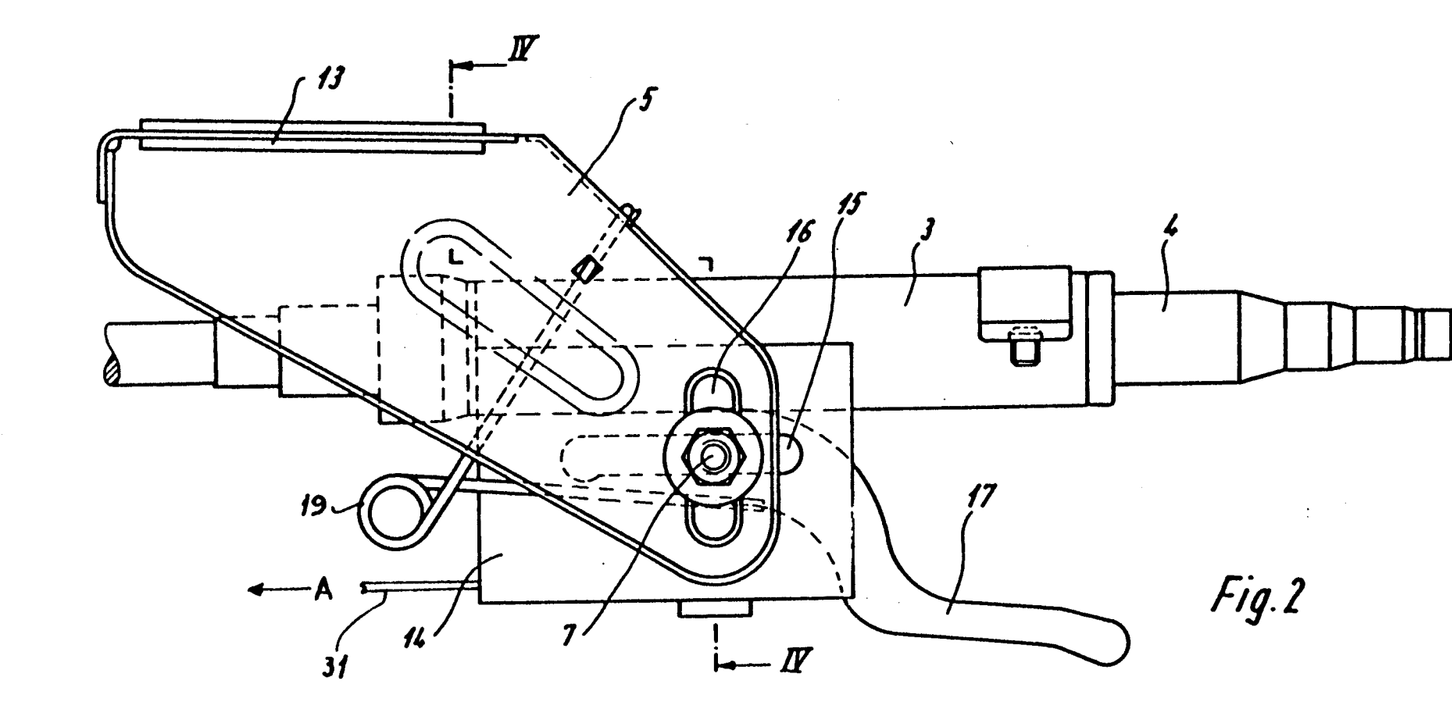
FIG. 2 is a side elevational view of the steering wheel column, the bearing for the column and certain other parts in a motor vehicle which embodies the improved apparatus.

FIG. 2 shows a torsion spring 19 serving to urge the lever 17 to a position in which the bearing 3, column 4 and steering wheel 20 are locked in selected positions.

An important advantage of the improved apparatus is that the steering wheel 20 can be moved out of the way in the event of a head-on collision of an intensity which results in predetermined displacement of the engine block and/or transmission case relative to the vehicle frame, i.e., in response to a predetermined displacement (in the direction of arrow A) of that end portion of the flexible element 31 which is anchored in the carrier 1. Such movement of the steering wheel 20 takes place regardless of the position of the lever 17, i.e., irrespective of whether or not the bearing 3 and its walls 14 are locked to the brackets 5 of the vehicle frame.

Another important advantage of the improved apparatus is that its reaction is instantaneous, i.e., the steering wheel 20 is compelled to move in the direction of arrow A in immediate response to displacement of the carrier 1 and its coupling elements 6 in the same direction.

A further important advantage of the improved apparatus is its simplicity. Such apparatus can be installed in motor vehicles with adjustable steering wheels as well as in motor vehicles wherein the steering column is merely rotatable about its axis but does not or cannot perform any other movements.

The improved apparatus can be utilized in combination with or in lieu of an air bag. It invariably ensures that the driver is less likely to be injured or killed in the event of a serious head-on collision, especially if the flexible element 31 and/or any other part or parts of the means for entraining the carrier 1 in the direction of arrow A are designed to tighten the belts around the driver's body simultaneously with, or even prior to, movement of the carrier 1 in the direction of arrow A.

The improved apparatus is susceptible of numerous additional modifications without departing from the spirit of the invention. For example, the number of coupling elements 6 can be reduced to one or increased to three or more. The motion receiving portion 18 can be omitted if the coupling element or elements are positioned to penetrate directly into the bearing 3 and/or into the steering column 4. Though the cutting edges 2 of the illustrated elements 6 are rather closely adjacent the underside of the motion receiving portion 18, they permit several adjustments of the steering wheel 2 relative to the brackets 5 as long as the flexible element 31 is not pulled in the direction of arrow A with a force which is required to cause the cutting edges 2 to establish a form-locking connection with the bearing 3 and/or column 4, either directly or by resorting to motion transmitting means. The extent of that angular movement of the carrier 1 about the axis of the shaft which is required to initiate the establishment of a form-locking connection between the exposed cylindrical portions of the coupling elements 6 and the motion receiving portion 18 is minimal to thus ensure practically instantaneous entrainment of the bearing 3 in the direction of arrow A as soon as a head-on collision occurs provided that the collision is sufficiently severe to result in certain minimal displacement of a vehicle part which causes the flexible element 31 to pull the carrier 1 in the direction of arrow A.

The illustrated coupling elements 6 exhibit the additional advantage that they reduce the likelihood of excessive instantaneous rise of tensional stresses upon the material of the bearing 3 and/or steering column 4 in the event of a serious head-on collision. This is due to gradual penetration of cutting edges 2 into the material of the motion receiving portion 18 or directly into the material of the bearing 3 and/or steering column 4. Once the form-locking connection is fully established, the column 4 (and hence the steering wheel 20) is capable of following each and every increment of movement of the flexible element 31 in the direction of arrow A to thus ensure timely removal of the steering wheel 20 from the path of possible forward propulsion of the torso and/or head of the occupant of the driver's seat.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for reducing the likelihood of injury to a driver of a motor vehicle of the type wherein a column member for a steering wheel is installed in a bearing member and at least one of said members is movable away from a position in front of the driver of the motor vehicle by a displacing unit which is responsive to a head-on collision whose intensity exceeds a predetermined minimum value, comprising a carrier uncoupled from and adjacent to said at least one of said members and connected with said unit to be displaced in the event of a collision of said intensity; and means for coupling said carrier to said at least one of said members in response to displacement of said carrier by said unit so that said at least one of said members is moved away from said position in front of the driver of the motor vehicle, said coupling means comprises at least one projection which establishes a form locking connection between said carrier and said at least one of said members in response to displacement of said carrier by said unit.

2. The apparatus of claim 1, wherein said at least one projection has a cutting edge which penetrates into said at least one of said members in response to displacement of said carrier by said unit.

3. The apparatus of claim 2, wherein said at least one projection has a substantially cylindrical portion and said cutting edge is provided on said cylindrical portion.

4. The apparatus of claim 3, wherein said cylindrical portion has an axis and said at least one of said members has a surface adjacent to said cylindrical portion and making an oblique angle with said axis.

5. The apparatus of claim 4, wherein said angle is an acute angle.

6. The apparatus of claim 5, wherein said carrier has a side adjacent to said at least one of said members, said cylindrical portion extending from said side and said axis making with said side an oblique angle.

7. The apparatus of claim 1, wherein said unit comprises means for pulling said carrier.

8. Apparatus for reducing the likelihood of injury to a driver of a motor vehicle of the type wherein a column member for a steering wheel is installed in a bearing member and at least one of said members is movable away from a position in front of the driver of the motor vehicle by a displacing unit which is responsive to a head-on collision whose intensity exceeds a predetermined minimum value, comprising a carrier uncoupled from and adjacent to said at least one of said members and connected with said unit to be displaced in the event of a collision of said intensity; and means for coupling said carrier to said at least one of said members in response to displacement of said carrier by said unit so that said at least one of said members is moved away from said position in front of the driver of the motor vehicle, said carrier is pivotable relative to said at least one of said members about a predetermined axis.

* * * * *